G. FLESSA.
TRANSMISSION GEARING.
APPLICATION FILED FEB. 4, 1909.

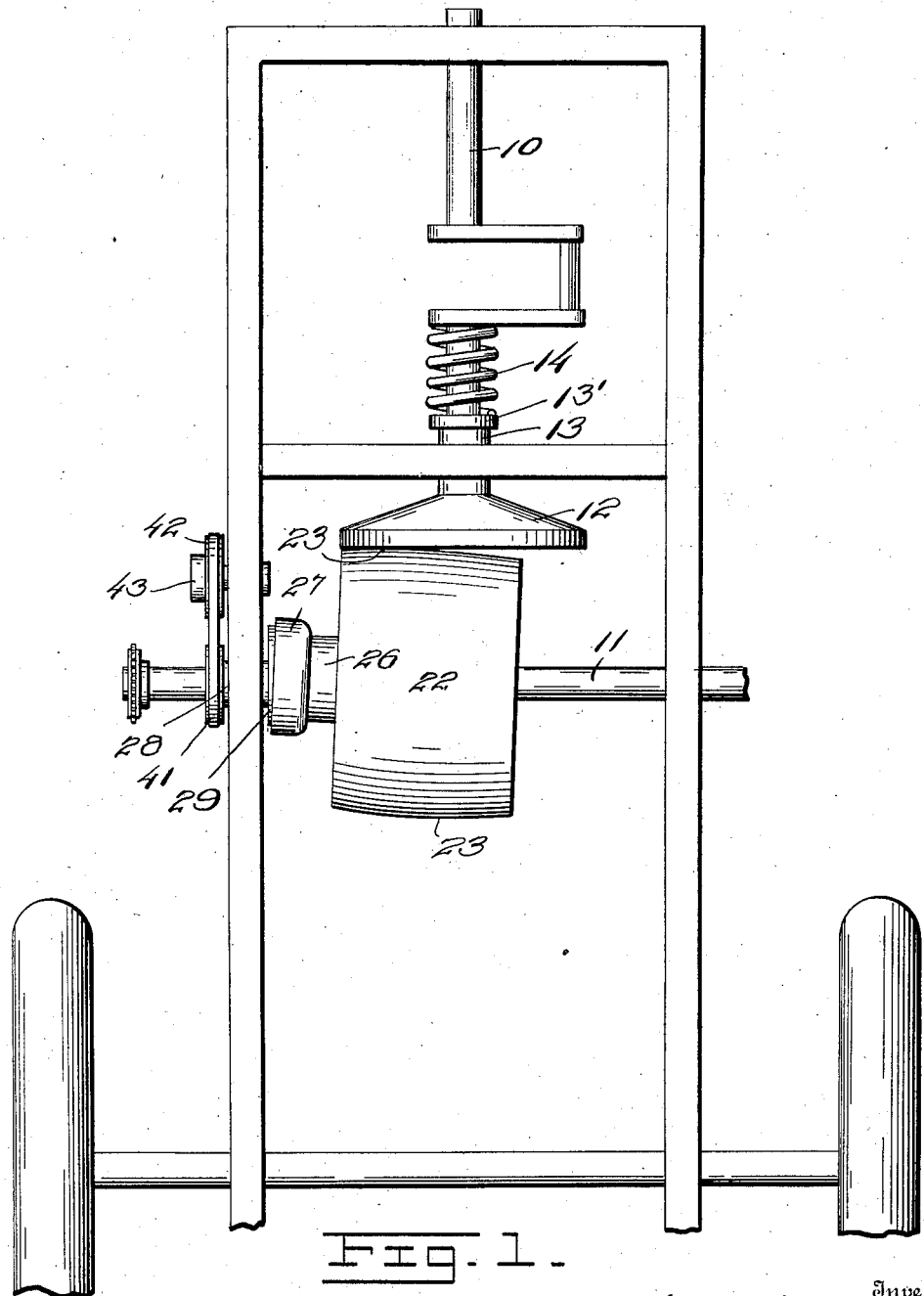

928,954.

Patented July 27, 1909.
3 SHEETS—SHEET 2.

Witnesses

Inventor
Geo Flessa,
By Woodward & Chandlee
Attorneys

G. FLESSA.
TRANSMISSION GEARING.
APPLICATION FILED FEB. 4, 1909.

928,954.

Patented July 27, 1909.
3 SHEETS—SHEET 3.

Inventor
Geo. Flessa,

Witnesses

By Woodward & Chandlee
Attorneys

UNITED STATES PATENT OFFICE.

GEORGE FLESSA, OF RAWHIDE, NEVADA, ASSIGNOR OF ONE-FOURTH TO N. BUEHLER, OF RAWHIDE, NEVADA.

TRANSMISSION-GEARING.

No. 928,954.      Specification of Letters Patent.      Patented July 27, 1909.

Application filed February 4, 1909. Serial No. 476,148.

*To all whom it may concern:*

Be it known that I, GEORGE FLESSA, a citizen of Germany, residing at Rawhide, in the county of Esmeralda and State of Nevada, have invented certain new and useful Improvements in Transmission-Gearing, of which the following is a specification.

This invention relates to automobiles, and more particularly to transmission gearing therefor, and has for its object to provide a frictional transmission device adapted to vary the speed of the motion transmitted without sliding movement of the friction members relatively.

Another object is to provide a new and efficient means for communicating motion frictionally to a shaft.

Other objects and advantages will be apparent from the following description and it will be understood that changes in the specific structure shown and described may be made within the scope of the claims, and that any suitable materials may be used without departing from the spirit of the invention.

Figure 6:
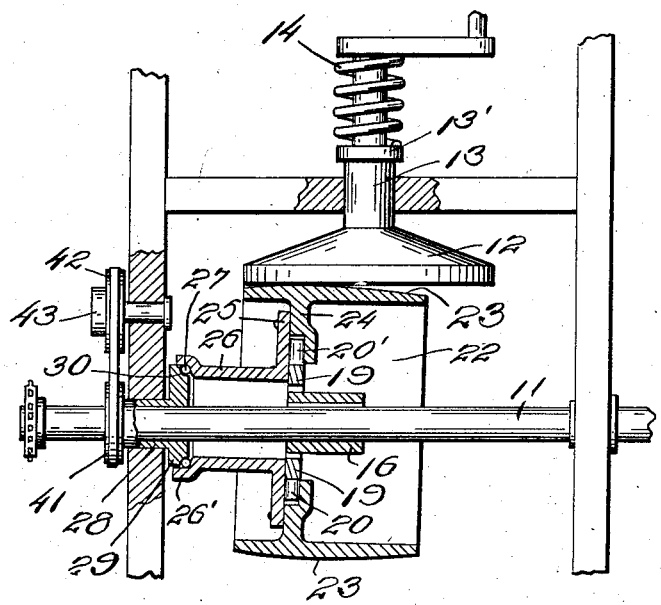
Figure 2:
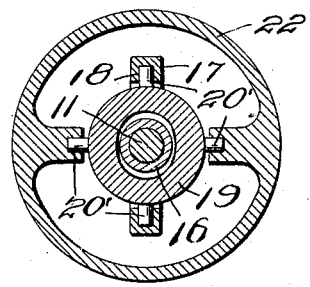
Figure 3:
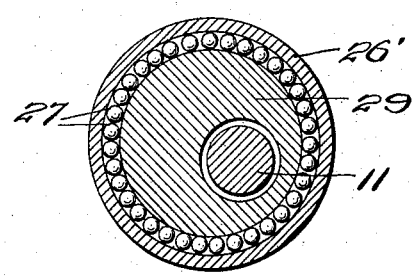
Figure 4:
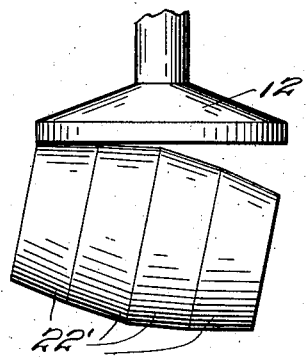
Figure 5:
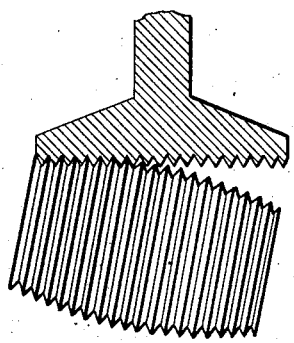
Figure 7:
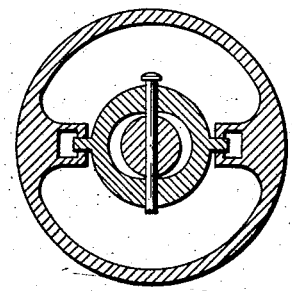

In the drawings forming a portion of this specification, and in which like numerals of reference indicate similar parts in the several views, Figure 1 is a top plan view of the device and a portion of the motor shaft, Fig. 2 is a cross section through the friction wheel, Fig. 3 is a similar detail of the cam operating means, Fig. 4 is a top view of a friction disk and a modified form of the friction wheel, Fig. 5 is a similar view of a still further modification of the device. Fig. 6 is a detail horizontal cross sectional view, Fig. 7 is a similar view to Fig. 2 in cross section showing a modified means for engaging the friction wheel 22 with the shaft 11.

Referring to the drawings, there is shown a portion of an automobile chassis having a motor shaft 10 thereon, and a laterally extending counter shaft 11 connected with the motor shaft by means of the present invention.

Slidably engaged upon the inner end of the shaft 10 there is a disk 12 having a collar 13 extending outwardly thereof over the adjacent portion of the shaft 10, the collar having a flange 13' at its outer end against which impinges a spring 14 engaged around the shaft 10 and seated suitably. The collar 13 is keyed to the shaft 10 against rotative movement but freely for sliding movement under the action of the spring 14. The shaft 11 is disposed inwardly of the disk 12, and has keyed thereon a sleeve 16 having outwardly offset arms 17 at one end thereof, provided with registering perforations 18 therein. A double cross head member 19 comprising a collar having an oval opening therethrough having quadri-spaced peripheral pins is engaged pivotally by means of two of the pins in the perforations 18. A friction wheel 22 is engaged pivotally over the remaining pins 20' and comprises an annular disk engaging portion 23 enlarged centrally and restricted gradually toward its opposite peripheral edges and disposed in close contact with the friction disk 12. The wheel 22 is provided with an interior flange 24, to which there is secured a collar 25 having a longitudinal tubular extension 26 enlarged at its outer end 26' to form a bearing for a purpose to be subsequently indicated.

Socket portions of a suitable type are carried by the wheel 22, preferably adjacent to one side where the wheel will bear against the outer portion of the disk 12, the sockets being engaged over the pins 20' of the member 19. Disposed revolubly upon the shaft 11 adjacent to the bearing 27 there is an actuating member 28 having a flange 29 thereon provided with a peripheral groove 30 on its outer face and adapted to fit snugly in the bearing 27, as shown. Balls are engaged between the groove 30 and the adjacent faces of the bearing 27.

The outer end of the actuating member 28 is provided with an engaging flange 41 adapted for engagement with suitable operative connections for rotating the member 28 to oscillate the wheel 22 to vary the point of its contact with the disk 12. As shown, the flange 41 is provided with a groove therearound receiving an endless belt carried by an adjacent wheel 42 to which is connected the wheel 43 for operation of the device. It will be understood that if desired the groove may be provided with a series of peripheral sprocket teeth for the engagement thereover of a chain to be extended to suitable points for engagement with suitable operating means. The flange 31 may also be provided with gear teeth and connected with an operating lever at another point by means of suitable gears. It will be seen that when the point of contact between the wheel 22 and the disk 12 is shifted to the center of the disk 12 the speed of the wheel 22 will be relatively slower than that of the disk 12. If the point of contact is shifted outwardly of the center of the disk it will be understood of course that the speed of the wheel 22 will be correspondingly increased, the movement of the wheel being induced in one direction when engaged with the disk on one side of its center and being rotated in an opposite direction when its point of contact is shifted to the opposite side of the disk.

Suitable connections may be made between the shaft 11 and a point of application for power.

It will be understood that the use of this mechanism will not be limited to automobiles, but may be adapted to use in various machines for converting and transmitting motion.

Fig. 4 shows a modified form of the wheel 22 the friction portion 22' having a series of smooth faces set at different angles with relation to the axis of the wheel.

In Fig. 5 there is shown a still further modification of the wheel 22 and of the disk 12, the disk having a series of concentric grooves therein, and the wheel 22 having a series of peripheral ribs thereon adapted to meshing engagement in the grooves. The wheel shown in Fig. 5 is gradually reduced in diameter from the center to either end thereof.

What is claimed is:—

1. The combination with a revoluble disk and a revoluble shaft adjacent thereto of a wheel having a laterally arcuate peripheral face multi-pivotally mounted upon said shaft and disposed in contact with said disk, and means for oscillating said wheel to vary the point of its engagement with said disk.

2. The combination with a revoluble shaft of a contact disk slidably keyed thereon, and means tending to yieldingly force said contact disk in a constant direction longitudinally of said shaft, a second shaft revolubly mounted at right angles with said first named shaft, a multi-pivoted wheel carried by said second named shaft, and disposed in contact with said disk, the face of said wheel being reduced laterally toward its opposite edges, and means for oscillating said wheel longitudinally of said second named shaft to alter the point of contact between said wheel and said disk.

3. The combination with a multi-pivoted revoluble member of an axial extension having a socket formed therein, and a revoluble member mounted eccentrically with relation to the axis of said revoluble member and engaged in said socket, for oscillation of said first named revoluble member upon rotation of said second named revoluble member.

4. The combination with a universal joint of a roller member carried thereby having an axial extension, and a revoluble member rotating upon a fixed axis adjacent thereto, said axial extension being engaged eccentrically with said last named revoluble member, and means for rotating the last named revoluble member.

5. The combination with a revoluble member having a friction surface, of a second revoluble member having a laterally arcuate peripheral contact member disposed against said first named revoluble member and being pivoted for universal oscillation longitudinally of its axis, and means for oscillating the second named revoluble member to alter the point of its contact with said first named revoluble member.

6. The combination with a revoluble member having a friction surface, of a second revoluble member having a laterally arcuate peripheral contact member disposed against said first named revoluble member and being pivoted for universal oscillation longitudinally of its axis, the second named revoluble member carrying an axially extending member, a revoluble actuating member mounted upon a fixed axis adjacent to said second named revoluble member, said axially extending member being engaged eccentrically with said actuating member, and means for operating said actuating member.

7. A transmission gearing including a revoluble driving member, a transverse revoluble shaft adjacent thereto, a revoluble driven member having a periphery convex longitudinally of its axis oscillateably mounted upon said shaft, and means for oscillating said driven member.

8. A transmission gearing comprising a revoluble disk and a revoluble shaft having a wheel mounted thereon, the periphery of which is convex in parallel relation to the axis thereof, said wheel being pivoted for universal oscillation upon said shaft and disposed in contact with said disk, an axially extending member carried by said wheel, and a revoluble actuating member mounted upon a fixed axis adjacent to said wheel said axially extending member being eccentrically engaged with said actuating member.

In testimony whereof I affix my signature, in presence of two witnesses.

GEORGE FLESSA.

Witnesses:
 A. E. SHRIG,
 N. BUEHLER.